United States Patent Office 2,852,338
Patented Sept. 16, 1958

2,852,338

SEPARATION OF PLUTONIUM FROM ELEMENTS HAVING AN ATOMIC NUMBER NOT LESS THAN 92

Fred Troop Fitch and Douglas Stewart Russell, Ottawa, Ontario, Canada, assignors, by mesne assignments, to the United States of America as represented by the United States Atomic Energy Commission No Drawing. Application June 2, 1947
Serial No. 751,962

5 Claims. (Cl. 23—14.5)

This invention relates to a method of separating plutonium from elements having an atomic number less than 92.

More particularly the invention relates to a fractionating method in which the plutonium is extracted in a non-aqueous phase preferentially to uranium and/or elements having an atomic number less than 92 which remain in an aqueous phase.

It has been proposed heretofore to so separate plutonium by the use of triglycoldichloride as the non-aqueous solvent.

It has been found that triglycoldichloride is much more effective for the purpose when it has added to it a saturated aliphatic aldehyde containing at least two carbon atoms, benzaldehyde, and/or polyhydric phenols having a hydroxyl group in at least one of the ortho and para positions, such as hydroquinone, dichlorohydroquinone, catechol or pyrogallol. Hydroquinone is effective in the presence of traces of hydrochloric acid or iron salts.

It is best that the solution stand after preparation for a period of about one-half hour in the case of the aldehyde addition, and about 2 hours in the case of the polyhydric phenol additions before it is used. Moreover the solutions should be used within 24 hours after preparation in the case of the aldehyde addition and within 15 to 20 days when the polyhydric phenol is added.

One to about 5% by volume of the aldehyde is effective although more may be used. Less than 1% requires longer times of treatment and less than .5% reduces the extractive capacity of the solvent. 0.1 gm. of the polyhydric phenols per 100 ml. of the triglycoldichloride is effective although 0.03 to 0.3 gm. per 100 ml. may be used.

In carrying out the invention pile irradiated uranium or other material containing plutonium and fission products is dissolved in nitric acid with the plutonium in the IV valency state. The acidity of the solution is adjusted to 1 to 3 N, preferably 2 N, in nitric acid and a salting out agent, such as ammonium, calcium or magnesium nitrate is added to substantially saturate the solution. The aqueous mixture is then treated with triglycoldichloride containing one or more of the addition agents above described to selectively extract the plutonium from the nitrate solution and leave the other elements in the aqueous phase.

The following specific example is given to illustrate the operation of the method:

100 ml. of an aqueous solution 7 M in ammonium nitrate, 2 M in nitric acid and having 0.6 gms./ml. of uranyl nitrate hexahydrate and with $10^4$ counts per min. per cc. of plutonium was treated with 25 cc. of triglycoldichloride, purified by vacuum distillation, and to which was added 0.025 gm. of hydroquinone. The distribution coefficient $$KPu = \frac{C \text{ organic phase}}{C \text{ aqueous phase}}$$

where C is the concentration of the plutonium at equilibrium in the two phases, was 9.3.

In the following table there are given distribution coefficients for plutonium concentrations as above defined.

| Additive | Concentration ml. additive/ 100 ml. triglycoldichloride | KPu after 30 minutes |
|---|---|---|
| Acetaldehyde | 1 | 7 |
| Acetaldehyde | 5 | 7 |
| Propionaldehyde | 5 | 8 |
| n. butyraldehyde | 5 | 7.2 |
| isobutyraldehyde | 5 | 7.7 |
| benzaldehyde | 5 | 6.0 |
|  | gms. additive/ 100 ml. triglycoldichloride | KPu after 2 hours |
| hydroquinone | 0.1 | 9.3 |
| dichlorohydroquinone | 0.1 | 10.1 |
| catechol | 0.1 | 8.6 |
| pyrogallol | 0.1 | 7.4 |

Without one of the above specified addition agents the distribution coefficient of commercial triglycoldichloride was erratic and frequently low.

By two or more successive treatments of the aqueous solution with the solvent extractive upwards of 95% of the plutonium may be recovered. The selective extraction of the solvent is high and the fission products essentially remain in the aqueous phase.

What we claim is:

1. In a method of extracting plutonium from aqueous nitrate solutions containing it in the IV valency state and fission products, the improvement which comprises treating the aqueous solution with triglycoldichloride containing at least one of a group consisting of a saturated aliphatic aldehyde containing at least two carbon atoms, benzaldehyde, and a polyhydric phenol having a hydroxyl group in at least one of the ortho and para positions.

2. A method as defined in claim 1 wherein the triglycoldichloride contains 0.5 to about 5% of one of said aldehydes.

3. A method as defined in claim 1 wherein the triglycoldichloride contains 0.03 to about 0.3 gm. of one of said polyhydric phenols per 100 ml.

4. A method as defined in claim 1 wherein the triglycoldichloride contains 0.1 gm. of one of said polyhydric phenols per 100 ml.

5. A method of extracting plutonium from materials containing it and fission products which comprises dissolving said material in nitric acid, adjusting the solution to substantially 2 N in nitric acid, substantially saturating the solution with a water soluble nitrate salt and treating the solution with triglycoldichloride containing at least one of a group consisting of a saturated aliphatic aldehyde containing at least two carbon atoms, benzaldehyde and a polyhydric phenol having a hydroxyl group in at least one of the ortho and para positions.

No references cited.